United States Patent [19]
Bae et al.

[11] 4,401,779
[45] Aug. 30, 1983

[54] HOMOGENEOUS LIQUID BARIUM CARBONATE-BARIUM ALKYL PHENATE-CADMIUM CARBOXYLATE STABILIZER SYSTEMS FOR RIGID POLYVINYL CHLORIDE RESINS

[75] Inventors: Kook J. Bae, East Northport; Lawrence R. Brecker, Brooklyn, both of N.Y.

[73] Assignee: Argus Chemical Corporation, Brooklyn, N.Y.

[21] Appl. No.: 336,126

[22] Filed: Dec. 31, 1981

[51] Int. Cl.[3] .......................... C08K 5/15; C08K 5/13
[52] U.S. Cl. ............................... 524/114; 252/400 R; 524/327; 524/396; 524/397; 524/399; 524/367
[58] Field of Search ............... 524/327, 114, 399, 424, 524/397, 396; 252/400

[56] References Cited
U.S. PATENT DOCUMENTS

| | | |
|---|---|---|
| 2,716,092 | 8/1955 | Leistner et al. ..................... 524/327 |
| 2,959,551 | 11/1960 | Le Suer ............................... 524/327 |
| 3,202,632 | 8/1965 | Lally et al. .......................... 524/327 |
| 3,787,357 | 1/1974 | Brecker .............................. 524/166 |
| 4,159,973 | 7/1979 | Hoch et al. ......................... 524/327 |

Primary Examiner—Veronica P. Hoke

[57] ABSTRACT

Homogeneous liquid stabilizer systems imparting to polyvinyl chloride resins a heat and light stability comparable to or exceeding organotin stabilizers are provided which are substantially solvent-free and have a low viscosity and a minimum flash point of 96° C., containing as the essential and only stabilizers a liquid barium carbonate-barium alkyl phenate and a cadmium salt of a branched chain aliphatic carboxylic acid having from about eight to about ten carbon atoms, optionally as a mixture of at least 85% cadmium salt of a branched chain aliphatic carboxylic acid with up to about 15% of a cadmium salt of an aromatic carboxylic acid having from about seven to about eleven carbon atoms, and/or of a saturated or unsaturated straight chain aliphatic carboxylic acid having from about nine to about twenty-two carbon atoms, the total weight percent of barium and cadmium in the stabilizer system being at least 18%, and the ratio of the weight percent of cadmium to the weight percent of barium being within the range from about 0.4:1 to about 1.2:1.

24 Claims, No Drawings

HOMOGENEOUS LIQUID BARIUM CARBONATE-BARIUM ALKYL PHENATE-CADMIUM CARBOXYLATE STABILIZER SYSTEMS FOR RIGID POLYVINYL CHLORIDE RESINS

Stabilizer systems for polyvinyl chloride resins are physically either one of two types: solids and liquids. The first stabilizer systems developed were solids, of which an outstanding example, still in wide use today, is the combination of metal salt stabilizers and organic triphosphites or hindered phenols of U.S. Pat. No. 2,564,646, patented Aug. 14, 1951 to William E. Leistner, Arthur C. Hecker and Olga H. Knoepke. While many of the triphosphites disclosed there are liquids, the metal salts used are mostly solids and no liquid combinations of the two are disclosed. The triphosphite prevents or retards precipitation of solid metal halide from the stabilizer compound as a cloud or haze in the stock, and is therefore referred to as an anti-clouding agent. A preference is indicated for mixtures of barium and cadmium salts, among others, and in the Examples combinations are used of barium and cadmium laurate, with triphenyl phosphite as the anti-clouding agent.

Combinations of mixed barium-cadmium salt stabilizers, such as barium-cadmium laurates, stearates, and ricinoleates, with organic triphosphites have generally been regarded as the first practical barium-cadmium stabilizers, and they do offer excellent initial color and long-term stability. However, one of their major disadvantages is their tendency to "plate-out" on calender rolls and other processing equipment.

"Plate-out" is a condition where the calendering rolls and/or embossing rolls become coated with a deposit from the composition being processed. The deposit may start out as a soft waxy material, just barely visible on the metallic contact surfaces of the processing equipment, but this builds up, particularly during long runs, and both the consistency and the quality of the plate-out can then become prohibitive, and interfere with acceptable surface finish of the film or sheeting. When plate-out occurs, the operation has to be shut down and the plate-out removed, which is a costly and time-consuming nuisance.

The plate-out problem was found to be correlated with the solid state of the stabilizer combination, and the answer to the plate-out problem was found to be a liquid stabilizer system. The first liquid stabilizer systems, still in use today, are those described in U.S. Pat. No. 2,716,092, patented Aug. 23, 1955, to William E. Leistner and Arthur C. Hecker. These liquid systems are based on a combination of a polyvalent metal salt or salts of a hydrocarbon-substituted phenol in conjunction with a water insoluble polyvalent metal salt of a fatty acid, the mixture of the two materials containing to advantage both barium and cadmium in the polyvalent metal component. In a modification, the invention comprises the phenolates and the said salts in conjunction with an organic phosphite.

These stabilizers systems were not only liquid but they also showed an enhanced stabilizing effectiveness, as compared to the polyvalent metal salt-triphosphite systems of U.S. Pat. No. 2,564,646, and accordingly these liquid systems found ready acceptance. Outstanding typical examples of this type of liquid system, by no means all of those available commercially, are the MARK M and MARK LL stabilizers, the MARK M and MARK LL systems being barium alkyl phenolate/cadmium carboxylate combinations with organic phosphite, and the MARK PL system being for addition of zinc carboxylate to the MARK M and MARK LL systems.

Liquid systems of this type are completely soluble in plasticizers, and consequently they are readily blended with the polyvinyl chloride resins on a mill by mixing them with the plasticizers, and then compounding the mix with the resin in the usual plasticization procedure. Used in this way, they are quite advantageous in the stabilization of plasticized polyvinyl chloride resins, and afford excellent initial color and outstanding resistance to the degrading effect of heat and light. High temperature processing is possible without the development of yellow undertones, and of course the plate-out problem is eliminated.

Nonetheless, despite these advantages, the available liquid stabilizer systems have not fully replaced solid stabilizer systems. In order to ensure uniformity, it is necessary that the liquid composition be homogeneous, and this homogeneity must be stable on storage. This has required the combination in the liquid of an inert solvent or other liquid stabilizer, which of course also acts as a diluent, and the result is that, weight for weight, the liquid systems do not offer as much barium or cadmium per unit weight as a solid system. This means that more of the liquid system must be used to obtain the same stabilizing effect.

In rigid polyvinyl chloride resins, the maintenance of rigidity and a high softening or fusion temperature means that any liquids to be incorporated into the polymer mix must be kept to a minimum. It is frequently true that the amount of liquid stabilizer required for stabilization is so high that it is impossible to use the liquid for a rigid polymer without deleteriously affecting the rigidity, and lowering the softening temperature too much. In other cases, the liquid system is unable to compete on the same economic level as a solid system because of its lower metal concentration. Besides that, the presence of the inert solvent reduces the flash point, and makes the mixture combustible, a condition which cannot be tolerated under some circumstances.

The consequence of these difficulties is that the stabilizers of preference for rigid (nonplasticized) polyvinyl resins have been organotin compounds, particularly the alkyl tin thioglycolates such as dibutyl tin bis-(isooctyl thioglycolate). These have afforded the desired heat and light stability required, without the rather complex formulations heretofore required for polyvalent metal carboxylate/phenolate stabilizer systems to bring them to the necessary standards for stabilization.

Exemplary of the complexity of the latter formulations is Baum, U.S. Pat. No. 3,454,514, patented July 8, 1969, who discloses a storage-stable stabilizer composition for vinyl halide resin compositions which comprises a stabilizer base: (a) a cadmium salt of an organic monocarboxylic acid; (b) a salt selected from the group consisting of barium and strontium salts of organic monocarboxylic acids, wherein one of the salts (a) and (b) is a salt of an aliphatic monocarboxylic acid and the other is salt of an aromatic monocarboxylic acid, and (c) a zinc salt of an organic monocarboxylic acid; and as about 1% to 50% by weight of said stabilizer base composition, a storage-stable additive comprising about 1 to 50 parts of a higher alkyl monoether of an alkylene glycol and about 1 to 50 parts of an organic carboxylic acid selected from the group consisting of aliphatic monocarboxylic acids and aliphatic dicarboxylic acids. The compositions can be liquid, but solid compositions also fall within the scope of the patent.

The barium salts are salts of organic carboxylic acids and of phenols, such as barium laurate, barium stearate, barium dioctyl phenolate, barium di-nonyl phenolate, and barium dinonyl-o-cresolate, but no "overbased" barium carbonate-alkyl phenate salts are disclosed. The barium plus cadmium content of the stabilizer composition is not disclosed, but in Examples 1 to 10, the liquid compositions, it is about 10%. All of the compositions contain 1 to 50 parts diluent by weight.

Another more recent example of a complex relatively dilute solvent-based liquid stabilizer system appears in U.S. Pat. No. 4,159,973, patented July 3, 1979, to Samuel Hoch, Robert E. Lally and Mario Q. Ceprini. The stabilizer systems provided by this patent comprise:

(a) a liquid, oil-soluble, epoxidized vegetable oil-compatible overbased barium salt complex that is the product obtained by contacting a reaction mixture that consists essentially of a basic barium compound, an alkylphenol, and an inert liquid organic diluent, in the amounts of at least 0.75 mole of alkylphenol per mole of barium compound and 10% to 50% by weight of the diluent, based on the weight of the reaction mixture, with carbon dioxide while the reaction mixture is maintained at a temperature of at least 180° C.;
(b) a polyvalent metal salt component;
(c) an organic phosphite component; and
(d) a hydrocarbon solvent in the amounts of 0.1 part to 5 parts by weight of the polyvalent metal salt component;
0.1 part to 5 parts by weight of the organic phosphite component; and
0.1 part to 5 parts by weight of the hydrocarbon solvent per part by weight of the overbased barium salt complex.

These stabilizer systems are said to be compatible with epoxidized vegetable oils and form stable mixtures with such oils.

The hydrocarbon solvents named at the top of column 3 are all combustible, and give liquid stabilizers of relatively low flash point. Indeed, in Table II, columns 7 and 8, the solvent used is described as "high-flash naphtha". Moreover, while the concentration of metal in the liquid is nowhere referred to as a consideration, in the Examples the concentration is relatively low, ranging between 7% and 9%.

The Hoch et al stabilizer systems are based on a special type of overbased barium salt complex that is prepared in accordance with the procedure described in the patent. Hoch et al point out that the normally available overbased barium alkyl phenate complexes are incompatible with epoxidized soybean oil and other epoxidized vegetable oils, and when they are combined with conventional oil-soluble cadmium and zinc salts and organic phosphites, the blend quickly becomes cloudy, as the epoxidized vegetable oil is mixed in, which presents a handling and storage problem, because the liquid system is not homogeneous. This problem is avoided by the special form of overbased barium alkyl phenate complex of the Hoch et al patent.

A further problem posed by the overbased barium alkyl phenate complexes is their relatively high viscosity, which has to be reduced by blending with a hydrocarbon solvent. This problem is alluded to by Hoch et al, who stress that their overbased barium alkyl phenate complexes are nonviscous liquids that are convenient to handle.

In accordance with the invention of Ser. No. 184,452, filed Sept. 5, 1980, now abandoned, homogeneous storage-stable liquid polyvinyl chloride resin stabilizer systems are provided that have a low viscosity and a flash point of at least 96° C. because they are substantially solvent-free. These systems are based on (1) a liquid barium carbonate-alkyl phenate stabilizer;
(2) a cadmium salt of a carboxylic acid selected from the group consisting of branched chain aliphatic carboxylic acids having from about five to about thirteen carbon atoms, aromatic carboxylic acids having from about seven to about eleven carbon atoms, and unsaturated aliphatic carboxylic acids having from about twelve to about twenty-two carbon atoms; and (3) a liquid organic triphosphite;

the sum of the weight percent of barium and the weight percent of cadmium being at least 13%; and the ratio of the weight percent of cadmium to the weight percent of barium Cd:Ba being within the range from about 0.5:1 to about 1.5:1; the organic triphosphite being in an amount to form a homogeneous storage-stable liquid.

In addition to these ingredients, which are the essential ingredients, these stabilizer systems can include any one or more of (a) a soluble zinc salt of a carboxylic acid;
(b) a soluble phenolic antioxidant;
(c) a soluble carboxylic acid; and
(d) a liquid organic acid phosphite.

Cadmium salts of mixtures of aliphatic and aromatic acids appear to offer an enhanced stabilizing effectiveness, and are therefore preferred.

These phosphite-containing stabilizer compositions use phosphite as the primary solubilizer to prepare a class of high metal content stabilizers from the defined class of cadmium carboxylates, while the stabilizer compositions of the present invention can be made without using any phosphite.

In accordance with the present invention, phosphite-free homogeneous liquid polyvinyl chloride resin stabilizer systems, capable of imparting a degree of resistance to heat and light deterioration to polyvinyl chloride resins comparable to or exceeding the best commercial organotin stabilizers, of which the alkyl tin thioglycolate esters are the recognized standard, are provided that have a low viscosity and a flash point of at least 96° C. because they are substantially solvent-free. These systems do not require a phosphite solubilizer and are quite simply based on only two essential stabilizers:

(1) a liquid barium carbonate-alkyl phenate stabilizer; and
(2) a cadmium salt of a carboxylic acid selected from the group consisting of branched chain aliphatic carboxylic acids having from about eight to about ten carbon atoms and mixtures thereof in an amount of at least 85% with up to about 15% of one or more cadmium salts of aromatic carboxylic acids having from about seven to about eleven carbon atoms, and saturated or unsaturated straight chain aliphatic carboxylic acids having from about nine to about twenty-two carbon atoms; the sum of the weight percent of barium and the weight percent of cadmium being at least 18%; and the ratio of the weight percent of cadmium to the weight percent of barium Cd:Ba being within the range from about 0.4:1 to about 1.2:1; these ingredients forming a homogeneous storage-stable liquid.

Since no liquid organic triphosphite is required to render the stabilizer system a homogeneous storage-stable liquid, triphosphites and other stabilizers are excluded.

Cadmium salts of mixtures of branched-chain aliphatic acids and aromatic acids or straight chain unsaturated or saturated aliphatic acids appear to offer an enhanced stabilizing effectiveness, and are therefore preferred.

In accordance with the invention, it has been determined that a solvent is not necessary to form a homogeneous storage-stable liquid system if the barium carbonate-alkyl phenate and cadmium carboxylate are selected from the classes indicated herein. The amounts of the barium carbonate-alkyl phenate and cadmium carboxylate are selected to form the homogeneous system. Since there is no low-boiling solvent present, either, nor other flammable high volatile liquid, the flash point of the liquid stabilizer is accordingly at least 96° C. or above, while the viscosity of the stabilizer is no more than 12000 cps at 25° C.

Because of their mutual solubility, it is possible to incorporate an extraordinarily high proportion of the barium carbonate-alkyl phenate and cadmium carboxylate. The minimum is 18 weight percent total Ba plus Cd, calculated as the metal, and the total can range to as high as 22%, and even as high as 25%. This high salt metal concentration has the advantage that much less of the liquid system is required, and virtually renders the liquid system equivalent to a solid organotin stabilizer system on a weight for weight basis of metal stabilizer. This means that much less is needed in rigid polyvinyl chloride resins, for example, so that the liquid stabilizer systems of the invention can be used in rigid polymers without deleterious effect on the rigidity and softening point.

The high stabilizing effectiveness of the liquid systems of the invention appears to be due in large measure to the stated ratio of cadmium to barium. In proportions of cadmium to barium outside the range, for example, less than the Cd:Ba ratio of 0.4:1 or more than the Cd:Ba ratio of 1.2:1; the stabilizing effectiveness is much reduced, which means that more of the stabilizer is required, which in turn would put the composition in the same category as the earlier available low metal concentration liquid systems.

It further appears that the carboxylic acid anion of the cadmium salt is important to stabilizing effectiveness. The cadmium salts of saturated straight chain aliphatic carboxylic acids having from five to eight carbon atoms, for example, are not nearly as effective as the cadmium salts of the acids within the above-described classes. The reason for this is not at present understood.

The liquid barium carbonate-alkyl phenate is known and described in U.S. Pat. No. 3,787,357, patented Jan. 22, 1974, to Lawrence Robert Brecker. The barium carbonate is combined with at least one barium alkyl phenate, usually in a relatively nonvolatile organic liquid, which acts as a liquefying agent for the carbonate, by itself or in combination with a nonvolatile polar compound. The barium alkyl phenate disperses the carbonate in the organic solvent during or after its formation.

The relatively nonvolatile organic liquid can be a hydrocarbon oil, a plasticizer, an epoxy ester, etc., or a combination thereof.

The proportion of barium carbonate to organic salt in this carbonate-organic salt combination is defined by the metal ratio, which is a number greater than 2, i.e., the number of metal equivalents is greater than the number of equivalents of the organic acid residue of the organic salt. The metal ratio can be as high as 20, or even higher, the limit being imposed only by an unacceptably high viscosity of the barium carbonate-barium alkyl phenate combination.

The alkyl phenate residue of the barium alkyl phenate has at least ten carbon atoms. There is no upper limit for the carbon content except that set by the availability of materials. Barium alkyl phenates with as many as 150 carbon atoms in the alkyl phenate residue give excellent results.

Exemplary alkyl phenols that can be used as their barium salt include secondary butyl-phenol, o-amyl-phenol, heptyl-phenol, tert-nonyl-phenol, caprylphenol, 6-t-butyl-2,4-dimethyl-phenol, 2,6-di-tert-butyl p-cresol, p-t-octyl-phenol, di-nony-phenol, decyl-phenol, dodecyl-phenol, and paraffin wax-alkyl-phenol; cycloalkyl-phenols such as o-cyclohexyl-phenol, p-cyclohexylphenol, and cyclooctyl-p-cresol; aralkyl-phenols such as 4-benzyl-o-cresol and ortho- and para-alphamethylbenzyl-phenols, and mixtures thereof.

The barium alkyl phenate salt may contain free unreacted phenol.

These barium carbonate-barium alkyl phenates are visually clear liquids, and leave no residue on filtration.

Many liquid barium carbonate-barium alkyl phenates are known. There is an extensive patent literature describing the preparation of such compositions. Unfortunately, the terminology employed is not uniform. Such compositions are sometimes referred to as solutions of oil-soluble barium carbonates, and sometimes as dispersions of oil-insoluble barium carbonates. The compositions are often called "overbased", to indicate that the ratio of total barium contained therein to the organic moiety is greater than the stoichiometric ratio of the neutral barium alkyl phenate, i.e., the number of barium equivalents is greater than the number of equivalents of the alkyl phenate residue.

Analytical techniques are available for determining the barium ratio and to characterize the liquid combinations of barium carbonate with barium alkyl phenate. The total barium content can be determined by standard methods such as atomic absorption, or extraction into aqueous hydrochloric acid, and complexometric titration of the barium in the extract.

The barium present as carbonate is measured in terms of the combined carbon dioxide content and the metal ratio is given by the expression:

$$2 \times \frac{\text{total equivalents of barium/g of sample}}{\text{total equivalents of barium/g of sample} - \text{equivalents } CO_2/g}$$

Liquid barium carbonates can be readily prepared by suspending, for instance, a barium base, e.g., oxide, hydroxide, alkoxide, carboxylate, phenate, etc., in a polar organic medium, carbonating the barium compound at elevated temperatures, and transferring the carbonated product to a relatively nonvolatile organic liquid containing a barium alkyl phenate with or without subsequent hydrolysis and removal of volatiles before final filtration of the resulting liquid. The sequence of operations is not critical; the barium alkyl phenate can be present during the carbonation.

The polar organic medium used for the reaction can contain volatile and nonvolatile polar compounds, called promoters in the literature. The volatile polar compounds are removed during the process and are not present in the finished product. A comprehensive overview of liquid organic combinations of barium carbonates, with barium alkyl phenates, their ingredients and their methods of manufacture can be obtained from a selected group of patents, for example, P. Asseff U.S. Pat. No. 2,616,905, F. Koft U.S. Pat. No. 3,544,463, and W. LeSuer U.S. Pat. No. 2,959,551.

A number of commercially available liquid barium carbonate-barium alkyl phenate compositions are suitable for use in preparing the liquid stabilizer systems of this invention. The following represents a nonlimiting selection:

| Material | Supplier | % Ba |
|---|---|---|
| Barium carbonate-barium dodecyl phenate | Lubrizol Corp. Wickcliffe, Ohio | |
| LD 2106 | | 26 |
| LD 2103 | | 23 |

The cadmium carboxylate is a salt of a nonnitrogenous branched chain aliphatic carboxylic acid having from about eight to about ten carbon atoms, or a mixture of at least 85% thereof with at least 15% of a carboxylic acid selected from the group consisting of
 (a) aromatic carboxylic acids having from about seven to about eleven carbon atoms; and
 (b) unsaturated and saturated straight chain aliphatic carboxylic acids having from about nine to about twenty-two carbon atoms.

Exemplary branched chain aliphatic carboxylic acids include 2-ethyl hexoic acid, isooctoic acid, 3,5,5-trimethyl hexoic acid, neodecanoic acid, and 2-methyl-2-ethyl hexoic acid.

Exemplary saturated straight chain aliphatic acids include capric acid, pelargonic acid, lauric acid, palmitic acid, myristic acid, stearic acid, and behenic acid.

Exemplary unsaturated straight chain aliphatic carboxylic acids include oleic acid, linoleic acid, linolenic acid, ricinoleic acid and erucic acid.

Exemplary aromatic acids include benzoic acid, ortho-, meta- and para-toluic acid; ortho-, meta- and para-ethylbenzoic acid; ortho-, meta- and para-butyl benzoic acid; ortho-, meta- and para-amyl benzoic acid; the various dimethyl benzoic acid isomers; the various diethyl benzoic acid isomers; and the various trimethyl benzoic acid isomers.

The cadmium carboxylate can be a liquid or a solid, in which case it is soluble in the liquid stabilizer system. A solid cadmium carboxylate can also be liquefied in course of preparation by carrying out the formation of the salt in the presence of a high-boiling organic solvent for the resulting cadmium carboxylate. This solvent will then be present in the finished cadmium salt, and accompany it in the blending with the other components of the liquid stabilizer system. The solvent, if used, should have a boiling point of at least 180° C., and the maximum amount should not exceed 17% solvent by weight of the stabilizer system, after combination of the liquefied cadmium carboxylate with the other components.

Useful solvents include aliphatic, cycloaliphatic, and aromatic hydrocarbons; aliphatic, cycloaliphatic and aromatic alcohols, ether alcohols, and ether alcohol esters; and esters of organic and inorganic acids, such as the alkyl, cycloalkyl and aryl phosphoric acid esters, benzoic acid esters, and stearic acid esters. Illustrative preparations of the liquefied cadmium carboxylate are given in the Examples.

Inasmuch as solvent may accompany the liquefied cadmium carboxylate in the homogeneous liquid stabilizer systems of the invention, the term "substantially solvent-free" when used to describe the systems of the invention does not exclude such solvent in amounts up to 17% by weight of the liquid stabilizer system.

The liquid stabilizer systems of the invention are effective in enhancing the resistance to deterioration by heat and light of any polyvinyl chloride resin. The term "polyvinyl chloride" as used herein is inclusive of any polymer formed at least in part of the recurring group:

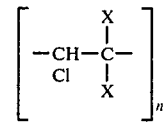

and having chlorine content in excess of 40%. In this group, the X groups can each be either hydrogen or chlorine, and n is the number of such units in the polymer chain. In polyvinyl chloride homopolymers, each of the X groups is hydrogen. Thus, the term includes not only polyvinyl chloride homopolymers but also after-chlorinated polyvinyl chlorides as a class, for example, those disclosed in British Pat. No. 893,288 and also copolymers of vinyl chloride in a major proportion and other copolymerizable monomers in a minor proportion, such as copolymers of vinyl chloride and vinyl acetate, copolymers of vinyl chloride with maleic or fumaric acids or esters, and copolymers of vinyl chloride with styrene. The stabilizer systems are effective also with mixtures of polyvinyl chloride in a major proportion with a minor proportion of other synthetic resins such as chlorinated polyethylene or a copolymer of acrylonitrile, butadiene and styrene.

These liquid stabilizer systems are of particular application to the stabilization of rigid polyvinyl chloride resin compositions, that is, resin compositions which are formulated to withstand high processing temperatures, of the order of 375° F. and higher, and whose mechanical strength would be adversely affected by an unduly high amount of liquid or low melting additive.

The stabilizer compositions of the invention can also be used with plasticized polyvinyl chloride resin compositions of conventional formulation, even though resistance to heat distortion is not a requisite. Conventional plasticizers well known to those skilled in the art can be employed such as, for example, dioctyl phthalate, octyl diphenyl phosphate and epoxidized soybean oil.

Particularly useful plasticizers are the epoxy higher esters having from 20 to 150 carbon atoms. Such esters will initially have had unsaturation in the alcohol or acid portion of the molecule, which is taken up by the formation of the epoxy group.

Typical unsaturated acids are acrylic, oleic, linoleic, linolenic, erucic, ricinoleic, and brassidic acids, and these may be esterified with organic monohydric or polyhydric alcohols, the total number of carbon atoms of the acid and the alcohol being within the range stated. Typical monohydric alcohols include butyl alcohol, 2-ethyl hexyl alcohol, lauryl alcohol, isooctyl alcohol, stearyl alcohol, and oleyl alcohol. The octyl alcohols are preferred. Typical polyhydric alcohols include pentaerythritol, glycerol, ethylene glycol, 1,2-propylene glycol, 1,4-butylene glycol, neopentyl glycol, ricinoleyl alcohol, erythritol, mannitol and sorbitol. Glycerol is preferred. These alcohols may be fully or partially esterified with the epoxidized acid. Also useful are the epoxidized mixtures of higher fatty acid esters found in naturally-occurring oils such as epoxidized soybean oil, epoxidized olive oil, epoxidized coconut oil, epoxidized cotton-seed oil, epoxidized tall oil fatty acid esters and epoxidized tallow. Of these, epoxidized soybean oil is preferred.

The alcohol can contain the epoxy group and have a long or short chain, and the acid can have a short or long chain, such as epoxystearyl acetate, epoxystearyl stearate, glycidyl stearate, and polymerized glycidyl methacrylate.

The polyvinyl chloride resin can be in any physical form, including, for example, powders, films, sheets, molded articles, foams, filaments, and yarns.

A sufficient amount of the stabilizer system is used to enhance the resistance of the polyvinyl chloride to deterioration in physical properties, including, for example, discoloration and embrittlement, under the heat and/or light conditions to which the polymer will be subjected. Very small amounts are usually adequate. Amounts within the range from about 0.001 to about 15% liquid stabilizer system by weight of the polyvinyl chloride resin are satisfactory. Preferably, an amount within the range from about 0.05 to about 5%, is employed for optimum stabilizing effectiveness.

Inasmuch as all of the essential components are liquids, the liquid stabilizer systems of the invention are readily formed as homogeneous liquids by simple blending and mutual dissolution, with heating, if necessary, and comprise a blend of:
(a) barium carbonate-barium alkyl phenate in an amount within the range from about 20 to about 80 parts by weight; and
(b) cadmium carboxylate selected from the groups noted in an amount within the range from about 80 to about 20 parts by weight.

The liquid stabilizer systems of the invention are employed as the sole heat and light stabilizer with other conventional stabilizers for other purposes.

Any of the conventional polyvinyl chloride resin additives, such as lubricants, plasticizers, emulsifiers, antistatic agents, flame-proofing agents, pigments and fillers, can be employed.

Preferably, the liquid stabilizer system is added to the polyvinyl chloride resin in an amount to provide in the resin from about 0.1 to about 2% of the barium carbonate-barium alkyl phenate; from about 0.1 to about 1.5% of the cadmium carboxylate salt; and from about 0 to about 1% total of one or more of the additional ingredients, as noted above.

The liquid stabilizer system is incorporated in the polymer in suitable mixing equipment, such as a mill or a Banbury mixer. If the polymer has a melt viscosity which is too high for the desired use, the polymer can be worked until its melt viscosity has been reduced to the desired range before addition of the stabilizer. Mixing is continued until the mixture is substantially uniform. The resulting composition is then removed from the mixing equipment and brought to the size and shape desired for marketing or use.

The stabilized polyvinyl chloride resin can be worked into the desired shape, such as by milling, calendering, extrusion or injection molding, or fiber-forming. In such operations, it will be found to have a considerably improved resistance to dicoloration and embrittlement on exposure to heat and light.

The stabilizer systems of the invention are recommended for use in the extrusion of rigid profiles such as siding and window frames where outstanding weatherability is required, and provide excellent light stability as compared to the sulfur-containing organotin stabilizers in common use for this application.

Because of the superior light stability provided, resin formulations containing lower levels of titanium dioxide may be produced, resulting in significant cost savings, typically 4 parts per hundred of resin $TiO_2$ instead of 10 parts per hundred of resin with tin. Four parts per hundred of resin $TiO_2$ plus 6 parts per hundred of resin $CaCO_3$ in the compound gives higher heat distortion than 10 parts per hundred of resin $TiO_2$.

These systems are also particularly well suited for the manufacture of dark colored extrudates. Dark colors absorb more heat from the sun and therefore need higher resistance to heat distortion and more initial resistance to long term aging than light colors.

Since epoxy plasticizers or phosphite chelators are not required, heat deflection temperatures are comparable to those obtained with liquid organotin stabilizers. These systems also provide freedom from plate-out and dusting, often encountered with solid barium-cadmium systems.

Stearic acid is the preferred lubricant, since the use of calcium stearate can upset the "metals balance" of barium/cadmium stabilizer. Other lubricants such as paraffin wax, polyethylene wax, etc., can be used at their standard levels and ratios.

The following Examples illustrate preferred liquid stabilizer systems and stabilized polyvinyl chloride resin compositions of the invention:

EXAMPLE A

Cd benzoate-Cd-2-ethyl hexoate was prepared by the following procedure:

2-Ethylhexoic acid 269 g and 220 g benzoic acid were heated to 90° C. Cadmium oxide 231 g was added and allowed to react at 100° to 120° C. The water of reaction was removed by application of vacuum while heating to 175° C. To thin the product for filtration the mixture was then cooled to 120° C. and 30 g triethyl phosphate and 293 g monobutyl ether of diethylene glycol added. The filtered product contained 20% cadmium and 32.3% solvent.

EXAMPLE B

Cd-2-ethyl hexoate was prepared by the following procedure:

2-Ethylhexoic acid 538 g was heated to 90° C. Cadmium oxide 231 g was added and allowed to react at 100° to 120° C. The water of reaction was removed by application of vacuum while heating to 175° C. To thin the product for filtration the mixture was then cooled to 120° C. and 30 g triethyl phosphate and 244 g monobutyl ether of diethylene glycol added. The filtered product contained 20% cadmium and 27.4% solvent.

EXAMPLES C TO F

Cd 2-ethylhexoate-Cd:stearate; Cd 2-ethylhexoate-CD laurate

The dry solid cadmium laurate and stearate are dissolved in warm (80° to 90° C.) Cd-2-ethylhexoate solution made as in Example B. On cooling to room temperature, some of these mixtures become pasty, but give good homogeneous stabilizers when blended with the barium component. Details are tabulated:

| Example No. | Cadmium carboxylate | Condition at room temperature | Barium blend |
|---|---|---|---|
| C | 2-EH—stearate 90/10 | Paste | Liquid |
| D | 2-EH—stearate 80/20 | Paste | Precipitates |
| E | 2-EH—laurate 90/10 | Liquid | Liquid |
| F | 2-EH—laurate 80/20 | Paste | Very viscous |

EXAMPLE G

The Cd 2-ethyl hexoate of Example 1 below was prepared by the following procedure:

2-Ethylhexoic acid 530 g was heated to 90° C. Cadmium oxide 231 g was added and allowed to react at 100° to 120° C. The water of reaction was removed by application of vacuum while heating to 175° C. To thin the product for filtration the mixture was then cooled to 120° C., 135 g high boiling aromatic hydrocarbon (b. 250° to 290° C.), 30 g triethyl phosphate, and 100 g monobutyl ether of diethylene glycol added. The filtered product contained 20% cadmium and 27.5% solvent.

EXAMPLE 1

A group of rigid polyvinyl chloride resin compositions was prepared, having the following formulation:

| | PARTS BY WEIGHT | | | | | |
|---|---|---|---|---|---|---|
| | Controls | | | | | |
| | 1 | 2 | 3 | 4 With phosphite | 5 | |
| | | With phosphite | With epoxy ester | With phosphite and epoxy ester | | Example 1 |
| Vinyl chloride homopolymer (Diamond 40) | 100 | 100 | 100 | 100 | 100 | 100 |
| Methyl methacrylate-butadiene-styrene impact modifier (Acryloid KM 323B) | 7 | 7 | 7 | 7 | 7 | 7 |
| Wax 160 (microcrystalline, m.p. 160° F.) | 1 | 1 | 1 | 1 | 1 | 1 |
| Polyethylene AC 629A | 0.3 | 0.3 | 0.3 | 0.3 | 0.3 | 0.3 |
| Titanium Dioxide | 10 | 10 | 10 | 10 | 10 | 10 |
| Epoxidized Soybean Oil | — | — | 1 | 2 | — | — |
| Calcium stearate (lubricant) | — | — | — | — | 0.6 | — |
| Stearic acid (lubricant) | — | — | — | — | — | 0.3 |
| Liquid stabilizer | — | — | — | — | 1.5 | 2.0 |
| BaCO₃—Ba nonylphenate (27% Ba) | — | — | — | — | — | 60 |
| Cd 2-ethylhexoate of Example G (20% Cd) | — | — | — | — | — | 40 |
| Methyltin tris (iso- | — | — | — | — | 100 | — |

-continued

| | PARTS BY WEIGHT | | | | | |
|---|---|---|---|---|---|---|
| | Controls | | | | | |
| | 1 | 2 | 3 | 4 With phosphite and epoxy ester | 5 | Example 1 |
| | | With phosphite | With epoxy ester | | | |
| octyl thioglycolate) | | | | | | |
| Diisodecyl phenyl phosphite | — | 0.5 | — | 0.5 | — | — |
| Commercial solid Ba/Cd stabilizer | 2.0 | 2.0 | 2.0 | 2.0 | — | — |
| Cd:Ba ratio in stabilizer | 1.8:1 | 1.8:1 | 1.8:1 | 1.8:1 | — | 0.5:1 |

These formulations were blended and sheeted off on a two-roll mill to form sheets 1 mm thick.

Heat Resistance Test

Strips one inch wide were cut off the sheets and heat resistance of these sheets was then determined by placing the strips in a Geer forced air oven at 375° F., withdrawing strips at five minute intervals at 375° F. and affixing the strips to cards, thus obtaining a progressive display of heat deterioration.

Colors were assigned by observation of the pieces, and these colors are given in Table I.

TABLE I (375° F. oven test)

| Time (minutes) | Color Controls | | | | | Example 1 |
|---|---|---|---|---|---|---|
| | 1 | 2 | 3 | 4 | 5 | |
| 0 | White | White | White | White | White | White |
| 5 | White | White | White | White | White | White |
| 10 | White | White | White | White | White | White |
| 15 | Off white | Off white | Off white | Off white | White | White |
| 20 | Slight buff tint | Slight buff tint | Slight buff tint | Off white | Off white | Off white |
| 25 | Slight buff tint | Slight buff tint | Slight buff tint | Slight buff tint | Off white | Off white |
| 30 | Buff | Buff with dark streaks | Buff | Light buff | Slight buff tint | Slight buff tint |
| 35 | Buff | Buff with dark streaks | Buff | Light buff | Slight buff tint | Slight buff tint |
| 40 | Buff | Buff with dark streaks | Buff | Light buff | Slight buff tint | Slight buff tint |

Heat Deflection Test

Portions of each milled sheet were compression molded at 400° F. and tested to determine the heat deflection temperature according to ASTM D1784. The results given in Table II were obtained.

TABLE II

| | Controls | | | | | Example 1 |
|---|---|---|---|---|---|---|
| | 1 | 2 | 3 | 4 | 5 | |
| Heat deflection Temperature | 171 | 167 | 164 | 158 | 166 | 168 |

TABLE II-continued

|  | Controls | | | | | Example 1 |
|---|---|---|---|---|---|---|
|  | 1 | 2 | 3 | 4 | 5 | |
| in °F. | | | | | | |

Light Deterioration Test

Portions of each milled sheet were exposed to a Uva-Test Germicidal lamp at room temperature for 161 hours and the color noted at four intervals. The results are given in Table III.

TABLE III

Accelerated Ultraviolet Exposure (Uva-Test Germicidal Lamp)

| | Controls | | | | | |
|---|---|---|---|---|---|---|
| | 1 | 2 | 3 | 4 | 5 | |
| | | With phosphite | With epoxide | With phosphite and epoxide | | Example 1 |
| Exposure time (hours) | Color | | | | | |
| 0 | White | White | White | White | White | White |
| 27 | White | White | White | White | Tan | White |
| 51 | White | Off white | White | White | Light brown | White |
| 95 | Off White | Slight buff tint | Slight buff tint | Off white | Brown | Slight buff tint |
| 161 | Slight buff tint | Light buff | Light buff | Light buff | Brown | Light buff |

Taken together, the results of the oven heat stability test (Table I), the heat deflection temperature measurements (Table II), and the ultraviolet exposures (Table III), demonstrate the unexpected and unique advantages of the stabilizer composition of this invention. It should be observed that the liquid alkyltin mercaptide stabilizer of Control 5 represents the type of stabilizer currently used in the production of house siding and other extruded profiles intended for outdoor use. Compared to Control 5, the stabilizer composition of this invention (Example 1) provides equivalent heat stability, far superior light stability, and a higher heat deflection temperature. On the other hand, the poorer heat stability associated with the solid barium cadmium stabilizer of Controls 1, 2, or 3 vitiates the improved light stability and heat deflection temperature as compared to Control 5, and overcoming the deficient heat stability of Controls 1, 2, or 3 by the addition of both phosphite and epoxide, as in Control 4, serious compromises the heat deflection temperature.

EXAMPLES 2 TO 6

A group of rigid polyvinyl chloride resin compositions was prepared illustrating the interactions of stabilizer and pigment choice on heat stability and light stability. The formulations were as follows:

| | Parts by Weight |
|---|---|
| Vinyl chloride homopolymer (Diamond 450) | 100 |
| Impact modifier (KM 323) | 7 |
| Wax 160 | 1 |
| Polyethylene AC 629A | 0.3 |
| Titanium dioxide | As shown below |
| Calcium carbonate (Atomite) | As shown below |
| Liquid stabilizer (Alkyltin or Ba/Cd) | As shown below |
| Lubricant | As shown below |

| | TiO$_2$ | CaCO$_3$ | MMTA[1] of Control 5 | Ba/Cd stabilizer of Example 1 | Ca stearate | Stearic Acid |
|---|---|---|---|---|---|---|
| Control 6 | 10 | None | 1.5 | — | 0.6 | — |
| Example 2 | 10 | None | — | 2.0 | — | 0.3 |
| Control 7 | 8 | 2 | 1.5 | — | 0.6 | — |
| Example 3 | 8 | 2 | — | 2.0 | — | 0.3 |
| Control 8 | 6 | 4 | 1.5 | — | 0.6 | — |
| Example 4 | 6 | 4 | — | 2.0 | — | 0.3 |
| Control 9 | 4 | 6 | 1.5 | — | 0.6 | — |
| Example 5 | 4 | 6 | — | 2.0 | — | 0.3 |
| Control 10 | 2 | 8 | 1.5 | — | 0.6 | — |
| Example 6 | 2 | 8 | — | 2.0 | — | 0.3 |

[1]Methyl tin tris(isooctyl thioglycolate)

Heat Stability Test

Heat stability was tested as in Example 1, in a forced air oven at 375° F., samples being withdrawn at five minute intervals.

The heat stability of Controls 6 to 10 substantially duplicated that of Control 5, and the heat stability of Examples 2 to 6 substantially duplicate that of Example 1, all samples being adequate in heat stability for extrusion into rigid profiles, for example, for use in siding.

Shearing Test

Samples of Example 2 and Control 6 were also tested under shearing conditions in the Brabender torque rheometer. The mixing bowl of the instrument was kept at 190° C. (375° F.) and the shearing heads were run at 45 rpm. The initial charge to the mixng bowl was 75 g, and small chips (less than 1 g each) were removed at two minute intervals during the test to preserve a record of color changes as the test proceeded. The test was terminated when a sharp increase in torque was noted, which happened to coincide with a sudden darkening of the samples.

The Example 2 and Control 6 samples both lasted eighteen minutes in this test.

Light Stability Test

The compositions of Examples 2 to 6 and Controls 6 to 10 were also tested for their ability to withstand the degradative influences of light. Samples of each formulation were exposed to the effects of air, intense natural sunlight, and daily and seasonal temperature changes at the Arizona test facility of DSET Laboratories, Inc. The samples were mounted at a 45° angle facing south. Samples of each formulation were returned for examination and recording of color at monthly intervals. The color of each returned sample is shown in Table IV.

TABLE IV

| After exposure Time (months) | Control 6 | Example 2 | Control 7 | Example 3 | Control 8 | Example 4 | Control 9 | Example 5 | Control 10 | Example 6 |
|---|---|---|---|---|---|---|---|---|---|---|
| Unexposed | White | White | White | White | White | White | White | White | White | White |
| 1 | White | White | White | White | White | White | White | White | Off white | White |
| 2 | White | White | White | White | White | White | Off white | White | Off white | White |
| 3 | Off white | White | Off white | White | Off white | White | Off white | White | Slight yellow tint | White |
| 4 | Off white | White | Off white | White | Off white | White | Slight yellow tint | White | Yellow | White |
| 5 | Off white | White | Slight yellow tint | White | Light yellow | White | Yellow | White | Amber | White |
| 6 | Slight yellow tint | White | Light yellow | White | Yellow | White | Yellow | White | Light amber | Off White |
| 7 | Slight yellow tint | White | Light yellow | White | Light yellow | White | Light yellow | Off white | Yellow | Slight yellow tint |
| 8 | Light yellow | White | Light yellow | White | Slight yellow tint | Off white | Slight yellow tint | Off white | Light yellow | Off white |
| 9 | Light yellow | White | Slight yellow tint | White | Slight yellow tint | Off white | Slight yellow tint | Off white | Light yellow | Off white |
| 10 | Slight yellow tint | Off white | Slight yellow tint | Off white | Slight yellow tint | Off white | Slight yellow tint | Off white | Slight yellow tint | Off white |

The results of the tests above demonstrate the vastly superior effectiveness of the stabilizer compositions of this invention compared to the traditionally used alkyltin mercaptide. In each pair in which choice of stabilizer and lubricant is the only variable (Control 6 vs. Example 2, Control 7 vs. Example 3, and so forth) thelight stability of the composition according to this invention is clearly very much better than that of the Controls. Moreover, it is of great practical significance that even the least effective Example of the invention, Example 6, is still much better in light stability than the most effective control, Control 6. The significance of this comparison is partly economic, because titanium dioxide is more costly than either PVC or calcium carbonate. Thus, the ability to obtain excellent results with reduced titanium dioxide levels is a cost saving whether or not the titanium dioxide is replaced with calcium carbonate. More important than just compounding economics is the gain in compounding versatility provided by the ability to get good light stability at low $TiO_2$ levels. Formulating dark colored profiles is facilitated, because there is less of the high tinting strength of $TiO_2$ that must be overcome by excessive levels of added color pigment.

EXAMPLES 7 AND 8

A group of rigid polyvinyl chloride resin compositions (including Example 2 and Control 6 from the preceding group) was prepared illustrating the interactions of stabilizer and pigment choice on heat stability and heat deflection temperature. The formulations were as follows:

| | Parts by Weight |
|---|---|
| Vinyl chloride homopolymer (Diamond 450) | 100 |
| Impact modifier (KM 323) | 7 |
| Wax 160 | 1 |
| Polyethylene AC 629A | 0.3 |
| Titanium dioxide | As shown below |
| Calcium carbonate | As shown below |
| Liquid stabilizer (alkyltin or Ba/Cd) | As shown below |
| Lubricant | As shown below |

| Ingredient | Control 6 | Example 2 | Control 11 | Example 7 | Control 12 | Example 8 |
|---|---|---|---|---|---|---|
| Titanium Dioxide | 10 | 10 | 5 | 5 | 5 | 5 |
| Calcium carbonate (Atomite) | — | — | 5 | 5 | — | — |
| Calcium carbonate surface treated (Winnofil S) | — | — | — | — | 5 | 5 |
| MMTA alkyltin mercaptide[1] | 1.5 | — | 1.5 | — | 1.5 | — |
| Calcium stearate (lubricant) | 0.6 | — | 0.6 | — | 0.6 | — |
| Ba/Cd stabilizer of Example 1 | — | 2.0 | — | 2.0 | — | 2.0 |
| Stearic acid | — | 0.3 | — | 0.3 | — | 0.3 |

[1]Methyl tin tris (isooctyl thioglycolate)

Heat Deflection Test

The samples were subjected to the heat deflection test of Example 1 with the following results:

TABLE V

| | Control 6 | Example 2 | Control 11 | Example 7 | Control 12 | Example 8 |
|---|---|---|---|---|---|---|
| Heat deflection Temp. °F. | 160 | 166 | 164 | 168 | 170 | 172 |

Heat Stability Test

Tests were carried out with all the above formulations in the oven at 375° F., as shown in Table VI below:

TABLE VI

375° F. oven test

| Time (minutes) | Controls | | | Example No. | | |
|---|---|---|---|---|---|---|
| | 6 | 11 | 12 | 2 | 7 | 8 |
| 0 | White | White | White | White | White | White |
| 5 | White | White | White | White | White | White |
| 10 | White | White | White | White | White | White |
| 15 | Off white | Off white | Off white | White | White | White |
| 20 | Slight buff tint | Slight buff tint | Slight buff tint | Off white | Off white | Off white |
| 25 | Slight buff tint | Slight buff tint | Slight buff tint | Off white | Off white | Off white |
| 30 | Buff | Buff | Buff | Slight buff tint | Slight buff tint | Slight buff tint |
| 35 | Buff | Buff | Buff | Slight buff tint | Slight buff tint | Slight buff tint |
| 40 | Buff | Buff | Buff | Slight buff tint | Slight buff tint | Slight buff tint |

The heat deflection test results taken together with the light stability results of Examples 2 to 6 demonstrate the unexpected and unique advantage of the stabilizer compositions in rigid PVC formulations containing calcium carbonates for outstandingly high heat deflection temperature and low titanium dioxide levels for easy pigmentation with color pigments.

EXAMPLES 9 TO 12

Stabilizer compositions of this invention with a Cd/Ba ratio of approximately 0.5 were prepared by blending various cadmium salt preparations (40 parts by weight) with barium carbonate-barium monylphenate containing 27% barium (60 parts by weight). Cadmium salts containing only branched chain saturated acids, aromatic acids, and/or unsaturated aliphatic acids were prepared as described in Example G. Cadmium salts containing straight chain saturated aliphatic acids were prepared by blending cadmium 2-ethylhexoate prepared as in Example G with cadmium salts of the straight chain saturated acids. The compositions and certain properties of the stabilizers are shown in Table VII.

TABLE VII

| Example No | Cd salt | Wt. ratio of acids | Cd salt appearance | Ba:Cd stabilizer appearance | Stabilizer viscosity centipoises at 25° C. |
|---|---|---|---|---|---|
| H | 2EH—benzoate[1] | 55/45 | Dark brown oil | Homogeneous liquid | 10,200 |
| I | 2EH—oleate | 74/26 | Dark brown oil | Homogeneous liquid | 2800 |
| J | 2EH—isostearate[2] | 67/33 | Dark brown oil | Homogeneous liquid | 4500 |
| K | 2EH—stearate | 90/10 | White paste | Homogeneous liquid | 7900 |
| L | 2EH—laurate | 90/10 | Yellow oil | Homogeneous liquid | 7800 |

[1]2EH = 2-ethylhexoate
[2]Isostearate - name given to commercial mixture of branched C18 saturated acids (Emery Industries Inc.)

Each of the stabilizer compositions of Examples H to L was found to be a homogeneous liquid of adequately low viscosity for handling and use.

Certain other compositions having larger proportions of a second acid with 2-ethylhexoic acid in the cadmium salt component were found unsatisfactory after blending with barium carbonate-barium monylphenate (27% Ba) in approximately 40:60 ratio to give a Cd:Ba ratio of 0.5 as follows:

A cadmium 2-ethylhexoate-oleate with 54/46 weight ratio of the acids was a homogeneous liquid, but precipitated within three days after blending with the barium component. A cadmium 2-ethylhexoate-stearate with 80/20 weight ratio of the acids was a paste and precipitated within one day after blending with the barium component.

A cadmium-2-ethylhexoate-laurate with 80/20 weight ratio of the acids was a paste and gave a homogeneous but extremely viscous liquid, nearly a glass, after blending with the barium component.

A group of rigid polyvinyl chloride resin compositions was prepared as shown below using the above Examples I to L, with the composition of Example 1 included to permit comparison.

TABLE VIII

| | Parts by Weight | | | | |
|---|---|---|---|---|---|
| | 1 | 9 | 10 | 11 | 12 |
| Vinyl chloride homopolymer (Diamond 450) | 100 | 100 | 100 | 100 | 100 |
| Methyl methacrylate-butadiene-styrene impact modifier (Acryloid KM 323B) | 7 | 7 | 7 | 7 | 7 |
| Wax 160 (microcrystalline, m.p. 160° F.) | 1 | 1 | 1 | 1 | 1 |
| Polyethylene AC 629A | 0.3 | 0.3 | 0.3 | 0.3 | 0.3 |
| Titanium Dioxide | 5 | 5 | 5 | 5 | 5 |
| Calcium carbonate (Atomite) | 5 | 5 | 5 | 5 | 5 |
| Stearic acid (lubricant) | 0.3 | 0.3 | 0.3 | 0.3 | 0.3 |
| Liquid stabilizer | 2.0 | 2.0 | 2.0 | 2.0 | 2.0 |
| BaCO₃—Ba nonylphenate (27% Ba) | 60 | 60 | 60 | 60 | 60 |
| Cd 2-ethylhexoate of Example 1 (20% Cd) | 40 | — | — | — | — |
| Cd 2-ethylhexoate-oleate of Example I | — | 40 | — | — | — |
| Cd 2-ethylhexoate-isostearate of Example J | — | — | 40 | — | — |
| Cd 2-ethylhexoate-stearate of Example K | — | — | — | 40 | — |
| Cd 2-ethylhexoate-laurate of Example L | — | — | — | — | 40 |
| Cd:Ba ratio in stabilizer | 0.5:1 | 0.5:1 | 0.5:1 | 0.5:1 | 0.5:1 |

These formulations were blended and sheeted off on a two-roll mill to form sheets 1 mm thick.

Heat Resistance Test

Strips one inch wide were cut off the sheets and heat resistance of these sheets was then determined by placing the strips in a Geer forced air oven at 375° F. and at 400° F., withdrawing the strips at five minute intervals and affixing the strips to cards, thus obtaining a progressive display of heat deterioration.

Colors were assigned by observation of the pieces, and these colors are given in Table IX A (375° F.) and Table IX B (400° F.).

TABLE IX A (375° F. oven test)

| Time (minutes) | Color Example | | | | |
|---|---|---|---|---|---|
| | 1 | 2 | 3 | 4 | 5 |
| 0 | White | White | White | White | White |
| 5 | White | White | White | White | White |
| 10 | White | White | White | White | White |
| 15 | White | White | White | White | White |
| 20 | Off white | Off white | Off White | Off white | Off white |
| 25 | Off white | Off white | Off white | Off white | Off white |
| 30 | Slight buff tint | Slight buff tint | Slight buff tint | Slight buff tint | Slight buff tint |
| 35 | Slight buff tint | Slight buff tint | Slight buff tint | Slight buff tint | Slight buff tint |
| 40 | Slight buff tint | Slight buff tint | Slight buff tint | Slight buff tint | Slight buff tint |

TABLE IX B (400° oven test)

| Time (minutes) | Color Example | | | | |
|---|---|---|---|---|---|
| | 1 | 9 | 10 | 11 | 12 |
| 0 | White | White | White | White | White |
| 5 | White | White | White | White | White |
| 10 | Off white | White | Off white | White | White |
| 15 | Slight buff tint | Off White | Slight buff tint | Off white | Off white |
| 20 | Light buff with dark spot | Slight buff tint | Slight buff tint | Slight buff tint | Slight buff tint |
| 25 | Brown | Light buff with dark streaks | Light buff | Light buff | Light buff |
| 30 | Brown | Brown | Brown | Brown | Brown |
| 35 | Brown | Brown | Brown | Brown | Brown |
| 40 | Brown | Brown | Brown | Brown | Brown |

The results of the oven heat stability tests in Table IX A and Table IX B demonstrate the advantages of the stabilizer compositions of this invention, and particularly the additional stabilization obtained with the mixed cadmium salt based stabilizer compositions of Examples 9 to 12.

Having regard to the foregoing disclosure, the following is claimed as inventive and patentable embodiments thereof:

1. A homogeneous liquid stabilizer system imparting heat and light stability to polyvinyl chloride resins and which is substantially solvent-free and has a low viscosity and a minimum flash point of 96° C., consisting as the essential and only stabilizers of
   (1) a liquid barium carbonate-barium alkyl phenate and
   (2) a cadmium salt of a carboxylic acid selected from the group consisting of branched chain aliphatic carboxylic acids having from about eight to about ten carbon atoms, and mixtures thereof in an amount of at least about 85% with up to about 15% of one or more cadmium salts of aromatic carboxylic acids having from about seven to about eleven carbon atoms, and saturated and unsaturated straight chain aliphatic carboxylic acids having from about twelve to about twenty-two carbon atoms, the total weight preferred of barium and cadmium in the stabilizer system being at least 18%, and the ratio of the weight percent of cadmium to the weight percent of barium being within the range from about 0.4:1 to about 1.2:1, the barium and cadmium salts being in amounts to form a homogeneous liquid.

2. A stabilizer system according to claim 1 in which the cadmium salt is a salt of a mixture of aliphatic and aromatic acids.

3. A stabilizer system according to claim 2 in which the aliphatic acid is 2-ethylhexoic acid and the aromatic acid is benzoic acid.

4. A stabilizer system according to claim 1 in which the cadmium salt is a salt of a mixture of aliphatic branched chain and aliphatic straight chain acids.

5. A stabilizer system according to claim 4 in which the branched chain acid is 2-ethylhexoic and the straight chain acid is oleic.

6. A stabilizer system according to claim 4 in which the branched chain acid is 2-ethylhexoic and the straight chain acid is stearic.

7. A stabilizer system according to claim 4 in which the branched chain acid is 2-ethylhexoic and the straight chain acid is isostearic.

8. A stabilizer system according to claim 4 in which the branched chain acid is 2-ethylhexoic and the straight chain acid is lauric.

9. A stabilizer system according to claim 1 in which the liquid barium carbonate-alkyl phenate comprises barium carbonate combined with at least one barium alkyl phenate in a monvolatile organic liquid which acts as a liquefying agent for the carbonate.

10. A stabilizer system according to claim 9 in which the organic liquid is selected from the group consisting of hydrocarbon oils, plasticizers, epoxy esters, and mixtures thereof.

11. A stabilizer system according to claim 1 in which the metal ratio of barium carbonate to barium alkyl phenate is a number within the range from 2 to 20.

12. A stabilizer system according to claim 1 in which the alkyl phenate residue of the barium alkyl phenate has at least ten up to about one hundred fifty carbon atoms.

13. A stabilizer system according to claim 1 in which the ratio of total barium to the organic moiety in the barium carbonate-barium alkyl phenate is greater than the stoichiometric ratio of the neutral barium alkyl phenate.

14. A stabilizer system according to claim 13 in which the barium carbonate-barium alkyl phenate is barium carbonate-barium dodecyl phenate containing from 23 to 29% Ba.

15. A stabilizer system according to claim 1 in which the cadmium carboxylate salt is a liquid.

16. A stabilizer system according to claim 15 in which the cadmium salt is a salt of 2-ethyl hexoic acid and benzoic acid.

17. A stabilizer system according to claim 1 in which the cadmium carboxylate salt is liquefied in course of preparation, by carrying out the formation of the salt in the presence of a high-boiling organic solvent for the resulting cadmium carboxylate, this solvent accompanying the salt in the stabilizer system in an amount not exceeding 12% solvent by weight of the stabilizer system, after combination of the liquefied cadmium carboxylate with the other components.

18. A stabilizer system according to claim 17 in which the solvent is selected from the group consisting of aliphatic, cycloaliphatic and aromatic hydrocarbons; and aliphatic, cycloaliphatic and aromatic alcohols, ether alcohols, and ether alcohol esters; and esters of organic and inorganic acids.

19. A polyvinyl chloride resin composition having improved resistance to deterioration when heated at 350° F., comprising a polyvinyl chloride resin formed at least in part of the recurring group:

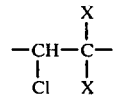

and having a chlorine content in excess of 40%, where X is either hydrogen or chlorine; and an amount to enhance the resistance to deterioration of the resin of a stabilizer composition according to claim 1.

20. A polyvinyl chloride resin composition in accordance with claim 19 in which the polyvinyl chloride resin is polyvinyl chloride homopolymer.

21. A polyvinyl chloride resin composition in accordance with claim 19 in which the polyvinyl chloride resin is a copolymer of vinyl chloride and vinyl acetate.

22. A polyvinyl chloride resin composition having improved resistance to deterioration when heated at 350° F., comprising a polyvinyl chloride resin formed at least in part of the recurring group:

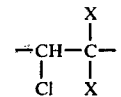

and having a chlorine content in excess of 40%, where X is either hydrogen or chlorine; and an amount to enhance the resistance to deterioration of the resin of a stabilizer composition according to claim 2.

23. A polyvinyl chloride resin composition having improved resistance to deterioration when heated at 350° F., comprising a polyvinyl chloride resin formed at least in part of the recurring group:

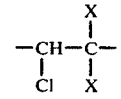

and having a chlorine content in excess of 40%, where X is either hydrogen or chlorine; and an amount to enhance the resistance to deterioration of the resin of a stabilizer composition according to claim 4.

24. A polyvinyl chloride resin composition according to claim 19 which is formulated as a rigid polyvinyl chloride resin to withstand a processing temperature of at least 375° F.

* * * * *